UNITED STATES PATENT OFFICE 2,481,825

PRODUCTION OF SYNTHETIC GELS

Gerald C. Connolly, Baton Rouge, La., assignor to Standard Oil Development Company, a corporation of Delaware No Drawing. Application July 9, 1943,
Serial No. 494,011

1 Claim. (Cl. 252—317)

This invention relates to the production of synthetic gels and pertains more particularly to a method of controlling the pore size or density of such gels.

Synthetic gels have heretofore been used extensively for the selective absorption of gases and liquids, for catalyzing many types of chemical reactions, and as a carrier or support for active catalysts. The synthetic gel products are all characterized by the fact that they are honeycombed with submicroscopic pores having a large internal surface. It is commonly known that the value of such materials for their intended purpose depends to a large extent on the physical structure or porosity of the gel. For example, in certain reactions in which the gel is employed as a catalyst or as a catalyst structure, a relatively coarse-pored gel is desirable, whereas for other reactions in which the gel is employed as a carrier or as a catalyst, a relatively fine-pored gel is more desirable.

It is therefore desirable to be able to maintain a close control over the porosity of the gel during its preparation in order that a product of uniform quality and activity for its intended use may be continuously produced.

One of the principal objects of the present invention is to provide a more simple and economical method for producing a gel of uniform density or porosity.

In an earlier Patent No. 1,900,859, filed jointly by myself and Ernest B. Miller, a method of controlling the porosity of a gel is described. This method involves subjecting an undried hydrogel to extensive washing treatment at a controlled temperature. As described in the patent, the density of the gel may be increased by increasing the temperature of the wash water, or it may be decreased by reducing the temperature of the wash water. In this manner the density of the gel can be controlled within certain limits. While the method outlined in the patent is effective, it suffers certain objections when employed in large scale commercial plants.

It has also been known that the porosity of a gel could be regulated within certain limits by controlling the hydrogen ion concentration of the water employed for washing the undried gel. Thus, for example, it has been pointed out that a gel having relatively fine pores can be produced by acid washing with water having a relatively low pH value and that relatively coarse gels could be produced by washing with alkaline water having a relatively high pH value. This method of controlling the porosity or density of a gel also has certain practical limitations when employed in large scale commercial processes.

I have found that the porosity or density of a gel is also affected by the time of the washing treatment. For example, it has been observed that, other conditions being equal, the apparent density of a gel decreases as the length of the washing treatment increases.

The term "apparent density" as used herein means the weight in grams of one cubic centimeter of the material made up of particles of a definite size. The apparent density values expressed herein were obtained from gel granules capable of passing an 8-mesh screen but incapable of passing a 14-mesh screen. These values were also obtained after activation of the gel at a temperature of about 850° F.

In accordance with the broader phases of the present invention, the density of the gel is maintained uniform by varying the length of the washing treatment or certain stages of the washing treatment.

In accordance with a preferred embodiment of the invention, the hydrogel is washed in two or more successive stages employing a wash water of different hydrogen ion concentration in each stage. When operating in this manner, the density of the gel is maintained at the desired point by varying the length of the individual washing stages. The total length of the washing treatment may be held constant. For example, when increasing the length of the first stage washing treatment, the length of the successive stage washing treatments may be correspondingly reduced so that the overall washing treatment is constant. When producing a relatively dense gel, such as gels having an apparent density ranging between 0.6 and 0.8, it is preferred to employ either a neutral or slightly alkaline wash during the initial stage and an acid wash during the final stage of the washing treatment. It is preferred to hold the hydrogen ion concentration of the wash water constant in both stages. The temperature of the wash water may be varied, but in accordance with the preferred embodiment of my invention both the temperature and the hydrogen ion concentration are held constant and the density of the gel is maintained uniform by varying the length of the treating in the individual stages.

The invention may be better understood from the following examples, it being understood that the values and conditions given therein are illustrative rather than limitative.

In each of the examples given, a silica hydrogel was first produced by the following procedure: A hydrogel was first formed by reacting a sodium silicate solution with sulfuric acid under conditions controlled to form a clear hydrosol at a temperature of about 80° F. to 90° F. The hydrosol so formed is capable of setting in about 4 to 5 hours into a clear, vibrant silica hydrogel. The hydrogel so formed was allowed to set until syneresis was fully developed, after which it was broken up by forcing the gel through one-inch screens. The resulting product was then placed in perforated trays and subjected to washing treatment, as hereinafter described.

EXAMPLE 1

A hydrogel prepared as above described was subjected to acid washing at a temperature of about 150° F., the water having a pH value of about 5.5. The following table illustrates the effect of the different lengths of washing treatment on the density of the gel:

Table 1

| Time, hours | 46 | 72 | 84 | 96 | 168 |
|---|---|---|---|---|---|
| Apparent density | 0.64 | 0.57 | 0.55 | 0.52 | 0.44 |

EXAMPLE 2

A silicon hydrogel prepared as above described was subjected to successive stage washing treatment employing a water having a pH value of 7.8 in the first stage and a pH value of 6.5 in the second stage. The following table illustrates the effect of temperature and length of the individual washing stages on the density of the gel:

Table 2

| First Wash Water | | | Second Wash Water | | | Apparent Density |
|---|---|---|---|---|---|---|
| Hours | pH | Temp., °F. | Hours | pH | Temp., °F. | |
| 40 | 7.8 | 100 | 6 | 6.5 | 100 | .49 |
| 24 | 7.8 | 80 | 22 | 6.5 | 120 | .60 |
| 17 | 7.8 | 70 | 29 | 6.5 | 125 | .65 |

It will be noted from the above table that the total length of the washing treatment was maintained constant in each of the three cases but that the length of the individual stages and the temperature of the wash water were varied in the three cases.

EXAMPLE 3

Portions of silica hydrogel prepared as above described were subjected to two-stage treatment employing a constant hydrogen ion concentration, a constant temperature, and a constant overall washing period, but the length of the individual stages was modified as illustrated in the table shown below:

Table 3

| First Wash Water | | | Second Wash Water | | | Apparent Density |
|---|---|---|---|---|---|---|
| Hours | pH | Temp., °F. | Hours | pH | Temp., °F. | |
| 26 | 7.8 | 70-75 | 20 | 4 | 70-75 | 0.61 |
| 21 | 7.8 | 70-75 | 25 | 4 | 70-75 | 0.65 |
| 17 | 7.8 | 70-75 | 29 | 4 | 70-75 | 0.71 |
| 16 | 7.8 | 70-75 | 30 | 4 | 70-75 | 0.75 |

From the above example it will be noted that the density of the gel may be regulated by controlling the length of the individual washing treatments without modifying either the pH value or the temperature of the wash water. The above method makes a convenient, economical and practical way of continuously maintaining a gel of uniform density. For example, if the density of the gel should tend to increase, it may be brought back to the desired density by increasing the length of the first-stage washing treatment, whereas if the density of the gel tends to decrease, it may be brought back to the required density by reducing the length of the first-stage washing treatment.

It will be understood that the invention is not limited to the particular densities illustrated in the above examples, since these densities may be modified by changing the various factors previously described. The present invention is directed to a method of continuously producing a gel of uniform density by varying the length of the individual washing stages.

It will be understood that following the washing treatment outlined in the above examples the product could be slowly dried to convert the hydrogel into a dry gel. Furthermore, catalytic agents may be incorporated into the gel either prior to the formation of the hydrogel or subsequent thereto. The invention has found particular application in the preparation of silica-alumina gels adapted for the catalytic conversion of hydrocarbon oils and particularly for the catalytic cracking of such oils. When preparing catalysts of this character, the silica hydrogel following the washing treatment above outlined may be impregnated with a solution containing an aluminum salt having a concentration capable of giving the required amount of alumina on the catalyst and the aluminum salt thereafter decomposed by ammonium hydroxide into the aluminum hydroxide.

Having described the preferred embodiment of the invention, it will be understood that it embraces such other variations and modifications as come within the spirit and scope of the accompanying claim.

What is desired to be protected by Letters Patent is:

In a process for the manufacture of synthetic, inorganic gels comprising silica wherein variations in the density of the gel products result from inadequate process controls, the method of compensating for said variations and thereby producing a product of more uniform density which comprises forming a silica hydrogel, washing the hydrogel with an aqueous medium having a constant pH value in the neutral to slightly alkaline range, thereafter washing the hydrogel with an aqueous medium having a constant acid pH value, maintaining the total length of the two washing treatments constant and varying the lengths of the individual washing treatments to compensate for said variations.

GERALD C. CONNOLLY.

REFERENCES CITED

The following references are of record in the file of this patent:

UNITED STATES PATENTS

| Number | Name | Date |
|---|---|---|
| 1,773,273 | Miller | Aug. 19, 1930 |
| 1,798,766 | Stoewener | Mar. 31, 1931 |
| 1,878,108 | Carstens et al. | Sept. 20, 1932 |
| 1,900,859 | Connolly et al. | Mar. 7, 1933 |

FOREIGN PATENTS

| Number | Country | Date |
|---|---|---|
| 444,914 | Germany | June 1, 1927 |
| 524,142 | Great Britain | July 31, 1940 |
| 530,730 | Germany | Aug. 5, 1931 |
| 574,721 | Germany | Apr. 19, 1933 |